United States Patent
Ide et al.

(10) Patent No.: US 12,454,855 B2
(45) Date of Patent: Oct. 28, 2025

(54) VEHICLE STRUCTURE

(71) Applicant: AISIN CORPORATION, Aichi (JP)

(72) Inventors: Yuki Ide, Ikeda (JP); Hiroshi Satake, Ikeda (JP); Naoki Nishimura, Ikeda (JP); Akinori Suzuki, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/611,346

(22) Filed: Mar. 20, 2024

(65) Prior Publication Data
US 2024/0328233 A1 Oct. 3, 2024

(30) Foreign Application Priority Data
Mar. 27, 2023 (JP) .................................. 2023-049706

(51) Int. Cl.
*E05F 15/643* (2015.01)
*B60J 5/06* (2006.01)

(52) U.S. Cl.
CPC .............. *E05F 15/643* (2015.01); *B60J 5/06* (2013.01); *E05Y 2201/64* (2013.01); *E05Y 2900/531* (2013.01)

(58) Field of Classification Search
CPC ..... E05F 15/643; E05F 15/681; E05F 15/655; E05F 15/689; E05F 15/662; E05F 15/697
See application file for complete search history.

(56) References Cited

U.S. PATENT DOCUMENTS

| 6,179,742 | B1* | 1/2001 | Haag | E05F 15/643 |
| | | | | 49/360 |
| 7,591,104 | B2* | 9/2009 | Takeda | E05F 11/483 |
| | | | | 49/352 |
| 11,598,140 | B2* | 3/2023 | Isono | E05F 15/646 |
| 12,078,002 | B2* | 9/2024 | Isono | E05F 15/655 |
| 2021/0277700 | A1 | 9/2021 | Isono et al. | |
| 2022/0307314 | A1* | 9/2022 | Schnapp | E05F 15/622 |

FOREIGN PATENT DOCUMENTS

| JP | 2019-100081 A | 6/2019 |
| JP | 2021-139189 A | 9/2021 |

OTHER PUBLICATIONS https://web.archive.org/web/20211124144010/https://www.campingworld.com/maintain-rv/sewer/sewer-connection.*

* cited by examiner

*Primary Examiner* — Marcus Menezes
(74) *Attorney, Agent, or Firm* — Finnegan, Henderson, Farabow, Garrett, and Dunner, LLP

(57) ABSTRACT

A vehicle structure includes a sliding door operation device configured to move a sliding door on a side portion of a vehicle. The device includes a motor unit and a moving member operating mechanism portion including a belt or a wire-shaped moving member coupled to the sliding door and a driven rotary member that receives a rotational driving force from the motor unit. The motor unit and the driven rotary member are provided with a serration shaft portion and a serration hole that are fitted to each other. The vehicle structure further includes a rotation operation unit configured to rotate the motor unit about centers of the serration shaft portion and the serration hole when the motor unit is pushed toward the driven rotary member to fit the serration shaft portion and the serration hole to each other.

6 Claims, 10 Drawing Sheets

FIG. 6A
FIG. 6B
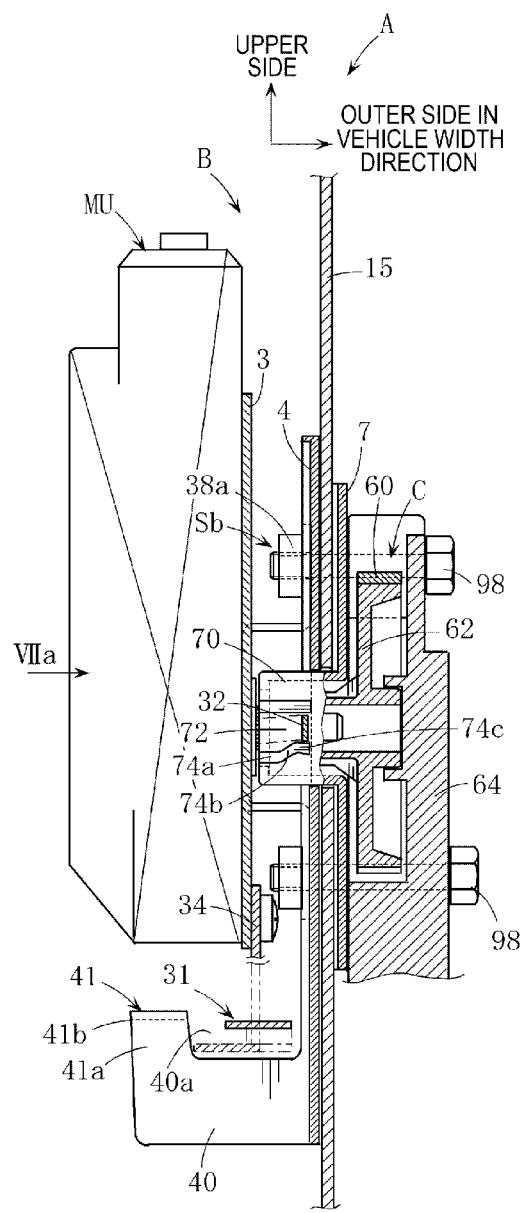
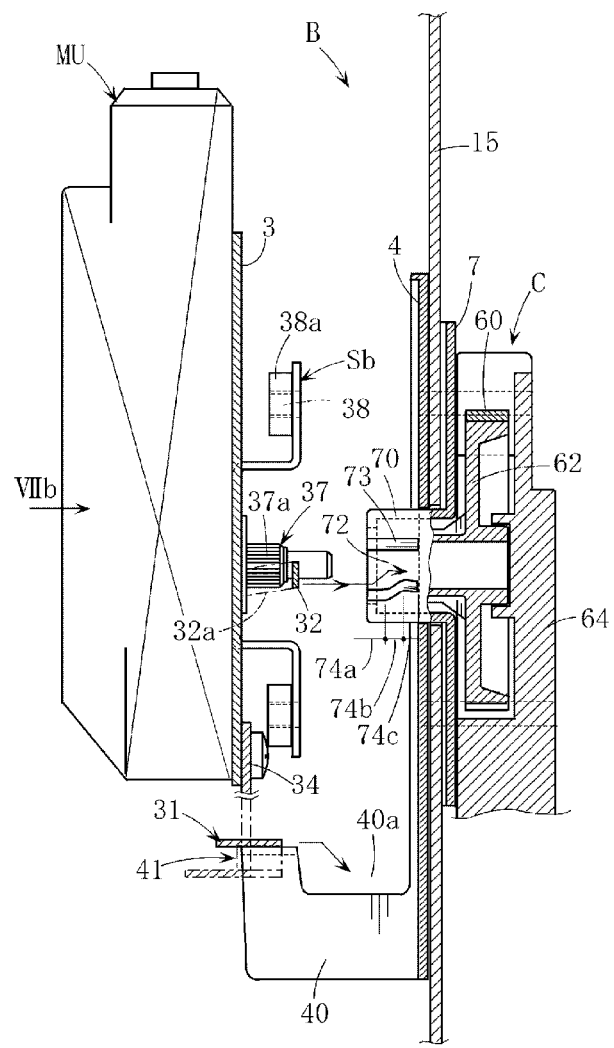

VEHICLE STRUCTURE

CROSS REFERENCE TO RELATED APPLICATIONS

This application is based on and claims priority under 35 U.S.C. § 119 to Japanese Patent Application 2023-049706, filed on Mar. 27, 2023, the entire content of which is incorporated herein by reference.

TECHNICAL FIELD

This disclosure relates to a vehicle structure provided with a sliding door, such as an automobile.

BACKGROUND DISCUSSION

As an example of a vehicle structure provided with a sliding door, there is a vehicle structure described in JP 2021-139189A (Reference 1).

The vehicle structure described in Reference 1 includes a sliding door that opens and closes an opening portion for getting on and off formed on a side portion of a vehicle. The sliding door may perform so-called automatic opening and closing operations, and includes, as a mechanism for performing these operations, a sliding door operation device in which a motor unit is used as a driving source.

The sliding door operation device includes a belt operating mechanism portion (moving member operating mechanism portion) in which a belt (moving member) that is coupled to the sliding door via a predetermined coupling portion and moves using the motor unit as the driving source is movable along a predetermined path. The belt operating mechanism portion is provided on an outer surface side of the side portion of the vehicle, whereas the motor unit is attached to an inner side of a vehicle compartment which is an inner surface side of the side portion. As a mechanism for transmitting a driving force from the motor unit to the belt operating mechanism portion, a mechanism is adopted in which a serration shaft portion is provided on an output shaft of the motor unit and a serration hole into which the serration shaft portion is fitted is provided in a predetermined pulley (driven rotary member) provided in the belt operating mechanism portion. With such a mechanism, the mechanism for transmitting the driving force from the motor unit to the belt operating mechanism portion can have a relatively simple configuration.

However, in the related art, there is room for improvement as described below.

That is, attachment work of the motor unit is performed on an inner surface side of the vehicle. However, the belt operating mechanism portion (moving member operating mechanism portion) is provided on the outer surface side of the side portion of the vehicle. Therefore, when the attachment work of the motor unit is performed, the serration hole which is formed in the predetermined pulley of the belt operating mechanism portion and into which the serration shaft portion of the motor unit is fitted may be disposed far from a place where the attachment work is performed. In such a case, when the attachment work of the motor unit is performed, it is not easy to appropriately fit the serration shaft portion into the serration hole, and attachment workability of the motor unit deteriorates. In order to make the serration shaft portion and the serration hole fit each other appropriately and smoothly, it is necessary to rotate the serration shaft portion so as to face the serration hole in an initial stage of the fitting (it is difficult to smoothly insert the serration shaft portion into the serration hole when protruding portions thereof are in contact with each other in a fitting direction (shaft length direction) of the serration shaft portion and the serration hole). Therefore, the attachment workability of the motor unit is worse.

The side portion of the vehicle is generally formed by, for example, a side outer panel and a side inner panel located on an inner side of the side outer panel in a vehicle width direction (on the inner side of the vehicle compartment). In such a case, the work of attaching the motor unit to the side outer panel is performed from a place further inside the vehicle compartment than the side inner panel via an opening portion formed in the side inner panel, and thus the attachment workability further deteriorates.

In order to facilitate vehicle manufacturing work and promote an improvement in productivity and a reduction in manufacturing cost, it is desired to appropriately solve the above-described problems.

A need thus exists for a vehicle structure provided with a sliding door which is not susceptible to the drawback mentioned above.

SUMMARY

According to an aspect of this disclosure, a vehicle structure provided with a sliding door includes a sliding door operation device configured to move the sliding door on a side portion of a vehicle. The sliding door operation device includes a motor unit attached to a predetermined position of the side portion on an inner side of a vehicle compartment, and a moving member operating mechanism portion including a belt or a wire-shaped moving member coupled to the sliding door and a driven rotary member that receives a rotational driving force from the motor unit, the moving member being movable along a predetermined path on an outer surface side of the side portion of the vehicle. The motor unit and the driven rotary member are provided with a serration shaft portion and a serration hole that are fitted to each other as a drive coupling unit of the motor unit and the driven rotary member. The vehicle structure provided with a sliding door further includes a rotation operation unit configured to rotate the motor unit about centers of the serration shaft portion and the serration hole when the motor unit is pushed toward the driven rotary member to fit the serration shaft portion and the serration hole to each other in a state in which the motor unit is disposed on a front side of the driven rotary member while not being attached to the predetermined position.

BRIEF DESCRIPTION OF THE DRAWINGS

The foregoing and additional features and characteristics of this disclosure will become more apparent from the following detailed description considered with the reference to the accompanying drawings, wherein:

FIG. 6A is a main-part schematic cross-sectional view illustrating a portion different from that in FIG. 5, and FIG. 6B is a main-part exploded schematic cross-sectional view (a cross-sectional view in a state before a motor unit is attached) for FIG. 6A;

FIG. 9A illustrates the motor unit, and FIG. 9B illustrates a region to which the motor unit is to be attached;

DETAILED DESCRIPTION

Hereinafter, a preferred embodiment disclosed here will be specifically described with reference to the drawings.

Figure 1:
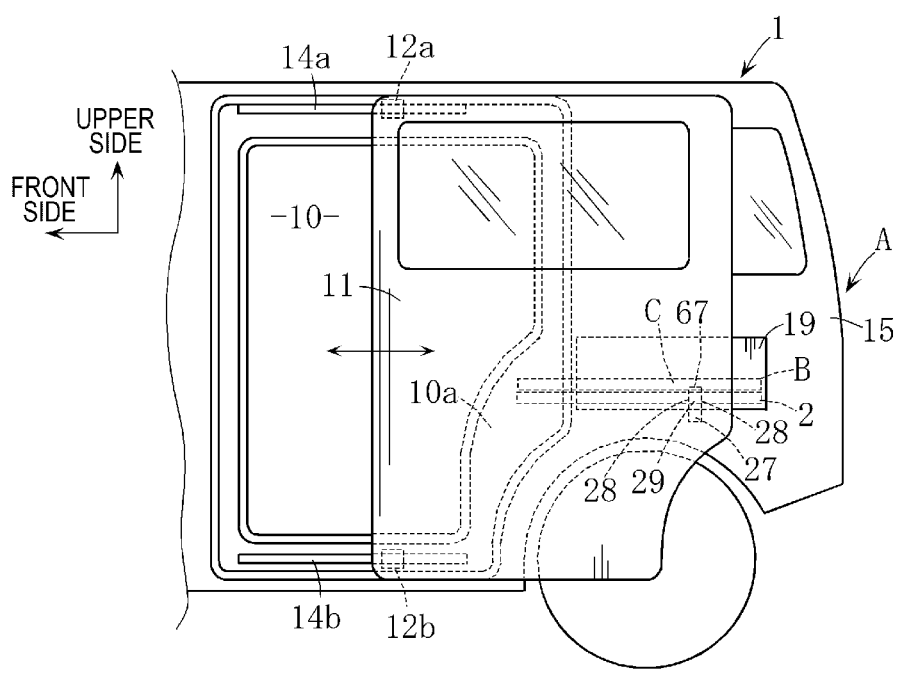
FIG. 1 is a main-part schematic side view illustrating an example of a vehicle structure provided with a sliding door according to this disclosure.
Figure 4:
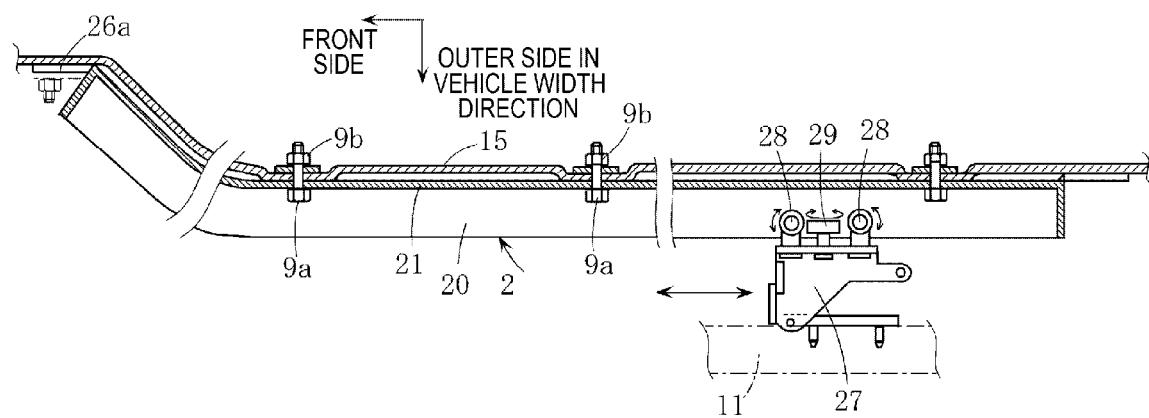
FIG. 4 is a main-part schematic cross-sectional view taken along a line IV-IV in FIG. 2.

A vehicle structure A provided with a sliding door (hereinafter, appropriately simply referred to as a "vehicle structure A") illustrated in FIG. 1 is provided with a sliding door 11 which can reciprocate in a vehicle front-rear direction so as to open and close an opening portion 10 for getting on and off provided on a side portion of a vehicle 1. An upper roller 12a, a lower roller 12b, and center rollers 28 and 29 to be described later with reference to FIG. 4 are attached to a vicinity of an upper end portion in a front portion of the sliding door 11, a vicinity of a lower end portion in the front portion of the sliding door 11, and a central portion of a rear portion of the sliding door 11 in a vertical height direction, respectively. These rollers 12a, 12b, 28, and 29 are fitted and held in upper, lower, and center slide rails 14a, 14b, and 2 which are provided on a vehicle body and extend in the vehicle front-rear direction, and are movable along these slide rails 14a, 14b, and 2.

The vehicle structure A includes a sliding door operation device B as a mechanism for moving the sliding door 11 in the vehicle front-rear direction on the side portion of the vehicle 1.

As clearly illustrated in FIGS. 2 to 6B, the sliding door operation device B includes, in addition to the center slide rail 2, a belt operating mechanism portion C, a motor unit MU as a driving source of the belt operating mechanism portion C, and an auxiliary member 4 for motor unit attachment.

Figure 2:
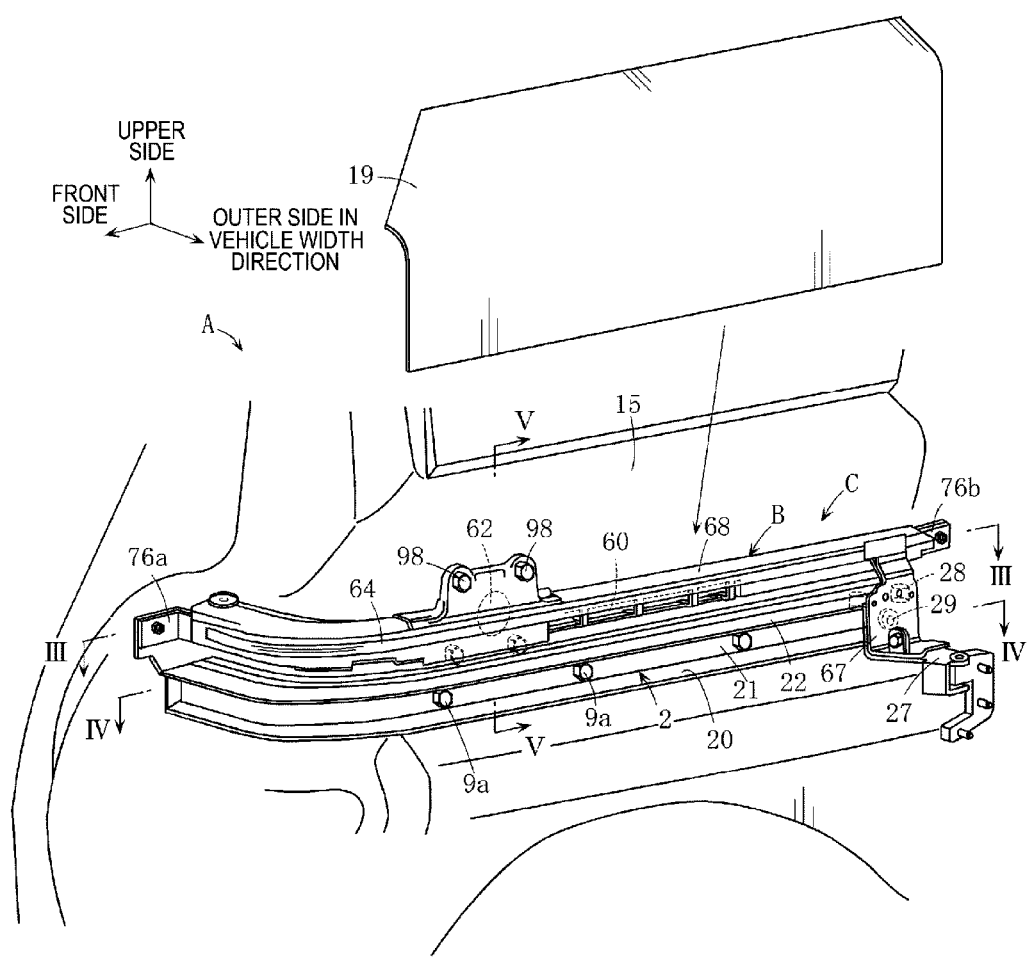
FIG. 2 is a main-part exploded schematic perspective view seen from vehicle exterior in a state in which the sliding door in the vehicle structure illustrated in FIG. 1 is omitted.

As clearly illustrated in FIGS. 2 and 4, the slide rail 2 is attached to an outer surface portion of a side outer panel 15 (rear side outer panel) which constitutes the side portion of the vehicle 1 using, for example, a plurality of bolts and nuts 9a and 9b, and extends in the vehicle front-rear direction. A region close to a front portion of the slide rail 2 is curved, and this corresponds to a shape of a rear edge portion 10a of the opening portion 10 for getting on and off illustrated in FIG. 1. The slide rail 2 includes a bottom wall portion 20, a side wall portion 21, and an upper wall portion 22, and has a substantially U-shaped cross section that opens outward in a vehicle width direction.

A curved bracket arm 27 to which the center rollers 28 and 29 capable of rolling in the slide rail 2 are attached belongs to and is attached to the slide rail 2, and the sliding door 11 is attached to the bracket arm 27. Accordingly, the central portion of the rear portion of the sliding door 11 in the vertical height direction is supported by the slide rail 2 via the bracket arm 27, and a movement of the central portion is guided. As will be described later, a bracket arm 67 of the belt operating mechanism portion C is coupled to the bracket arm 27, and the sliding door 11 moves in the vehicle front-rear direction when the belt operating mechanism portion C is driven.

The belt operating mechanism portion C is a mechanism portion that moves the bracket arm 67 in the vehicle front-rear direction in order to move the sliding door 11 in the vehicle front-rear direction, and includes a belt 60 to which the bracket arm 67 is attached, a plurality of pulleys 61 to 63 that allow the belt 60 to move circularly along a prescribed path, and a frame 64 that supports the plurality of pulleys 61 to 63.

Among these components, the belt operating mechanism portion C and the belt 60 correspond to specific examples of a "moving member operating mechanism portion" and a "moving member" in this disclosure, respectively.

Figure 3:
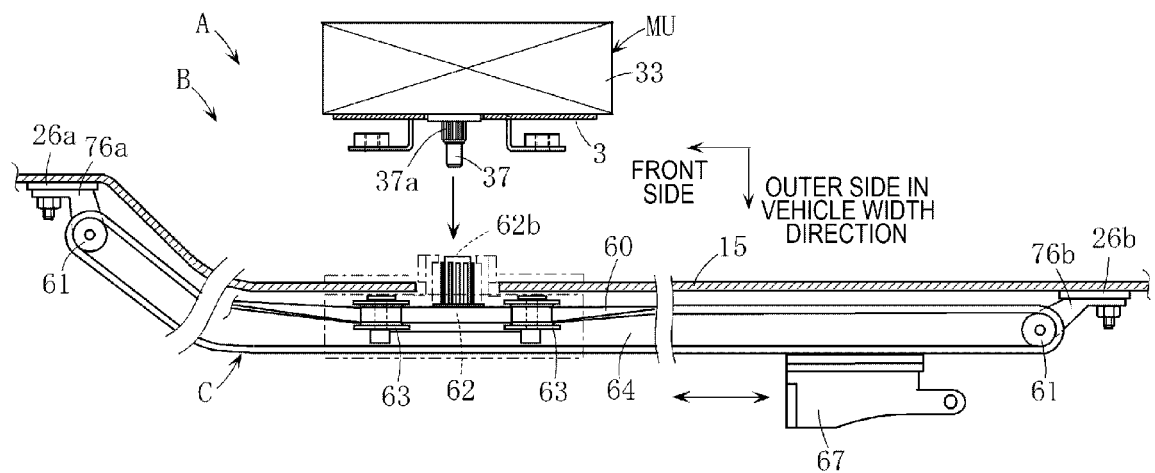
FIG. 3 is a main-part exploded schematic cross-sectional view taken along a line III-III in FIG. 2.

As clearly illustrated in FIGS. 2 and 3, the frame 64 is fixed in a manner of overlapping an upper side of the slide rail 2 on an outer surface side of the side outer panel 15. The fixation is achieved by, for example, fastening brackets 76a and 76b provided at both front and rear end portions of the frame 64 to brackets 26a and 26b provided at both front and rear end portions of the slide rail 2 by bolts.

Figure 11:
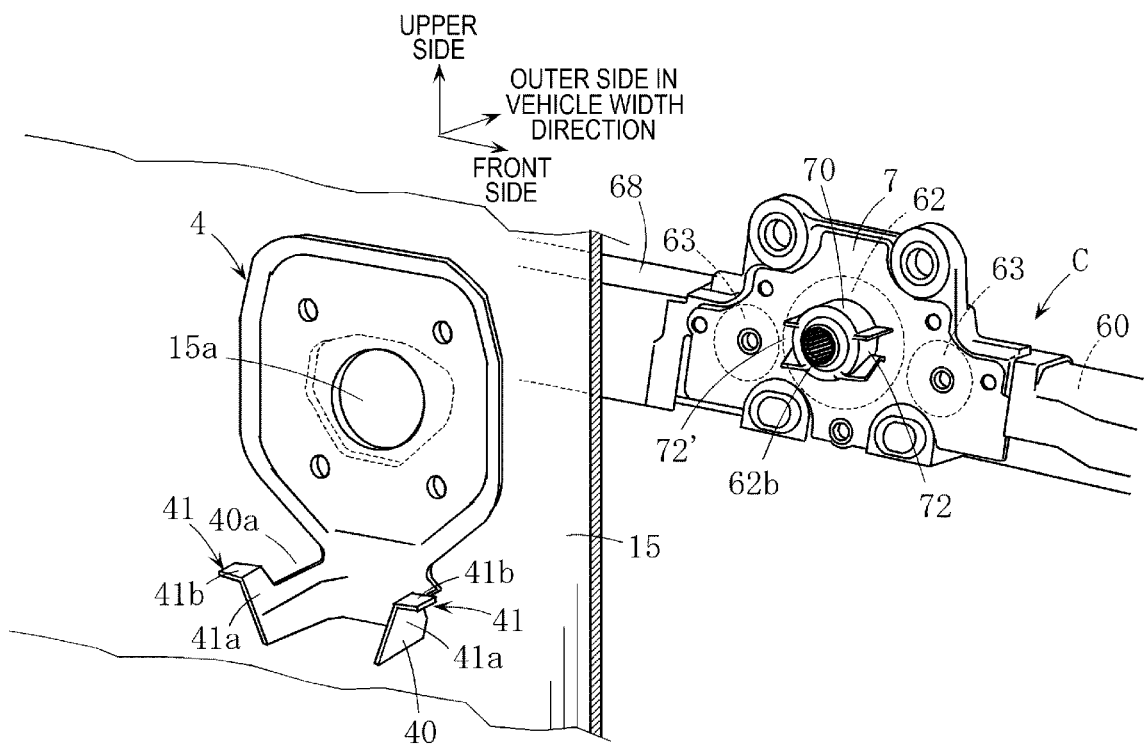
FIG. 11 is an exploded schematic perspective view of FIG. 9B.
Figure 12:
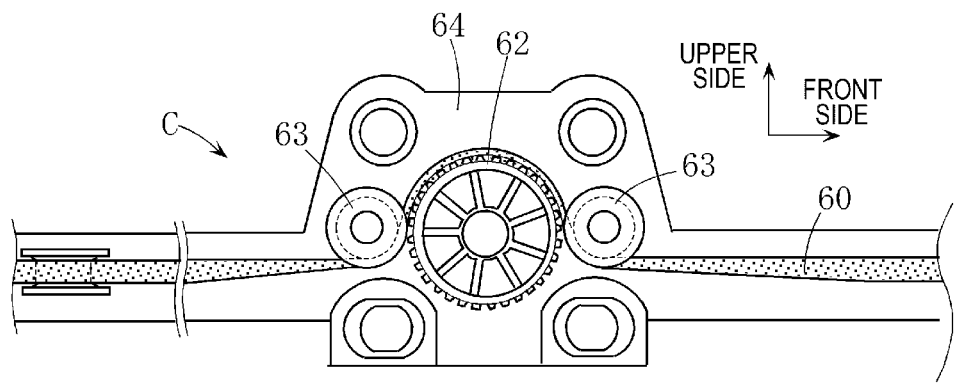
FIG. 12 is a view illustrating a schematic configuration of a part of a belt operating mechanism portion illustrated in FIG. 11.

The belt 60 is, for example, an endless toothed belt. The plurality of pulleys 61 to 63 are toothed pulleys corresponding to the belt 60. As clearly illustrated in FIG. 3, the plurality of pulleys 61 to 63 are a pair of front and rear pulleys 61, a drive pulley 62 that receives a driving force from the motor unit MU, and a pair of snub pulleys 63 on left and right sides of the drive pulley 62 (see also FIGS. 11 and 12). The belt 60 extends between the front and rear pulleys 61, and can move circularly in both forward and backward directions therebetween.

As illustrated in FIG. 2, a cover member 68 is attached to an upper side of the belt operating mechanism portion C to prevent inside of the belt operating mechanism portion C from getting wet with rainwater or the like. As illustrated in FIG. 1, a body side cover 19 (illustrated only in FIGS. 1 and 2 and omitted in other drawings) that covers the belt operating mechanism portion C and the slide rail 2 is attached to an outer surface side of the side portion of the vehicle 1. Accordingly, it is possible to protect a location provided with the belt operating mechanism portion C and the slide rail 2 and to improve an appearance of the vehicle 1.

As described above, the belt operating mechanism portion C is disposed on the outer surface side of the side outer panel 15, whereas the motor unit MU is disposed on an inner side of a vehicle compartment inside the side outer panel 15. A specific configuration for transmitting the driving force from the motor unit MU to the belt operating mechanism portion C will be described below.

That is, the drive pulley 62 of the belt operating mechanism portion C corresponds to an example of a "driven rotary member" in this disclosure, and receives a driving force from an output rotary shaft 37 of the motor unit MU. Unlike the pulleys 61, the drive pulley 62 and the pair of snub pulleys 63 on the left and right sides of the drive pulley 62 are rotatable on the frame 64 in a so-called lateral posture (a posture in which a rotation center axis extends substantially horizontally). A part of the belt 60 is twisted around a peripheral portion of the drive pulley 62 so as to be appropriately wound around the drive pulley 62 (see FIGS. 3 and 12).

Figure 5:
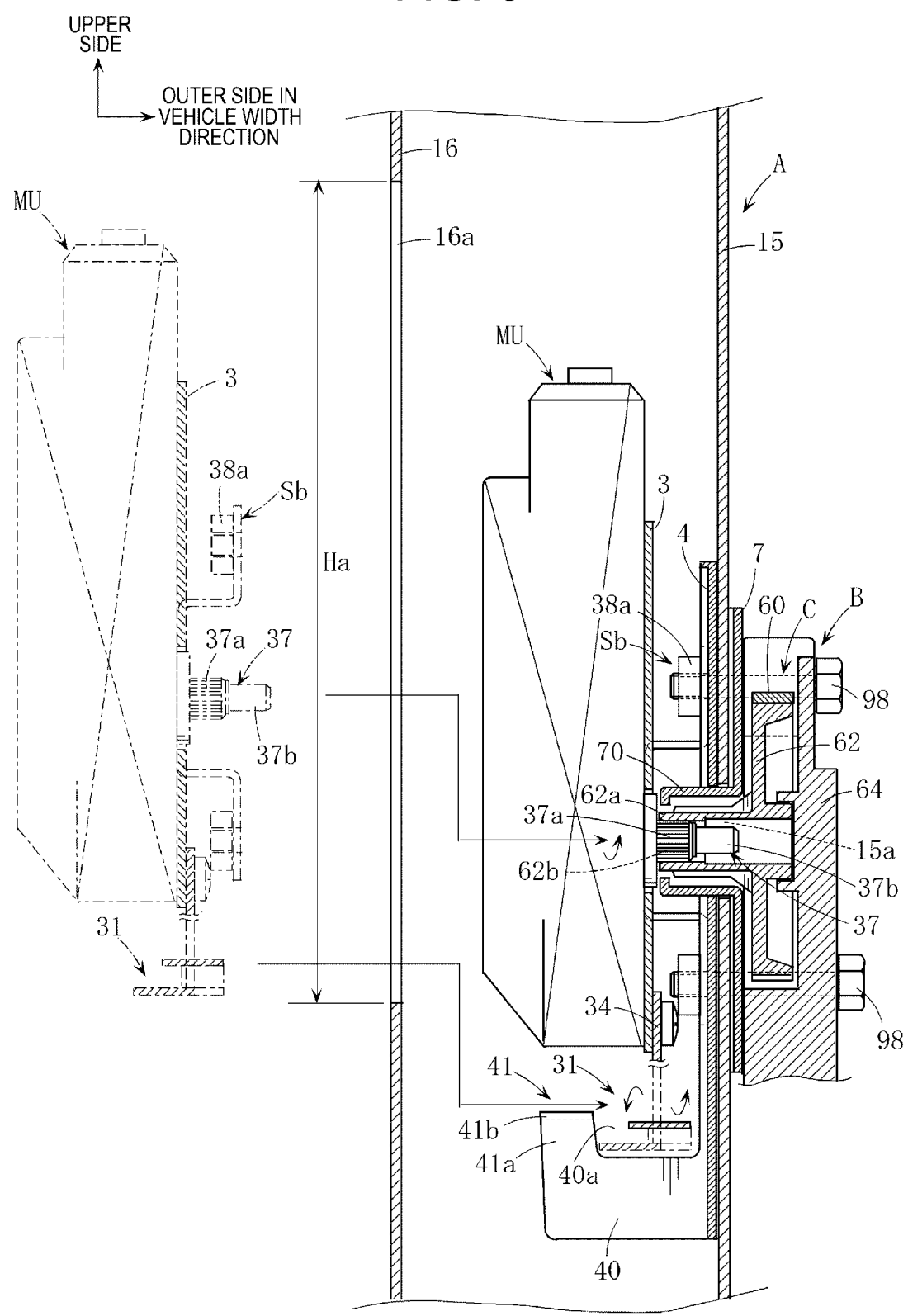
FIG. 5 is a main-part schematic cross-sectional view taken along a line V-V in FIG. 2.
Figure 8:
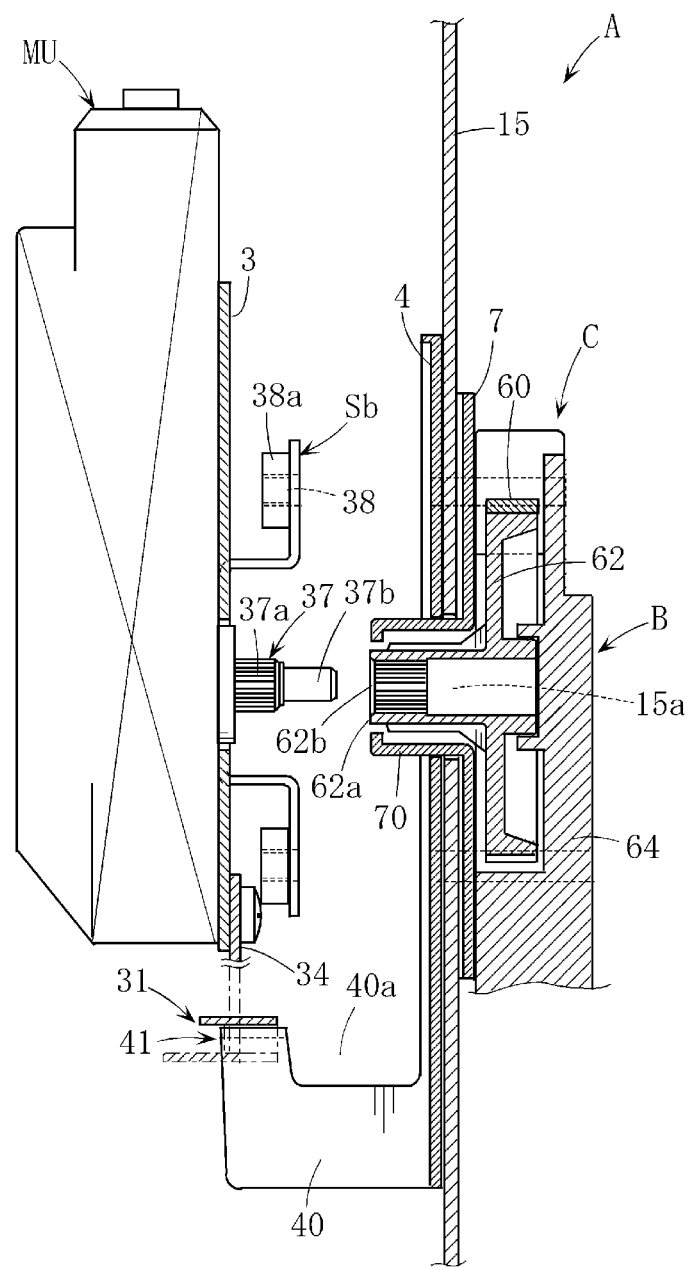
FIG. 8 is a main-part schematic cross-sectional view illustrating an example of a state during attachment before the motor unit in the vehicle structure illustrated in FIG. 5 is attached.
Figures 9A, 9B:
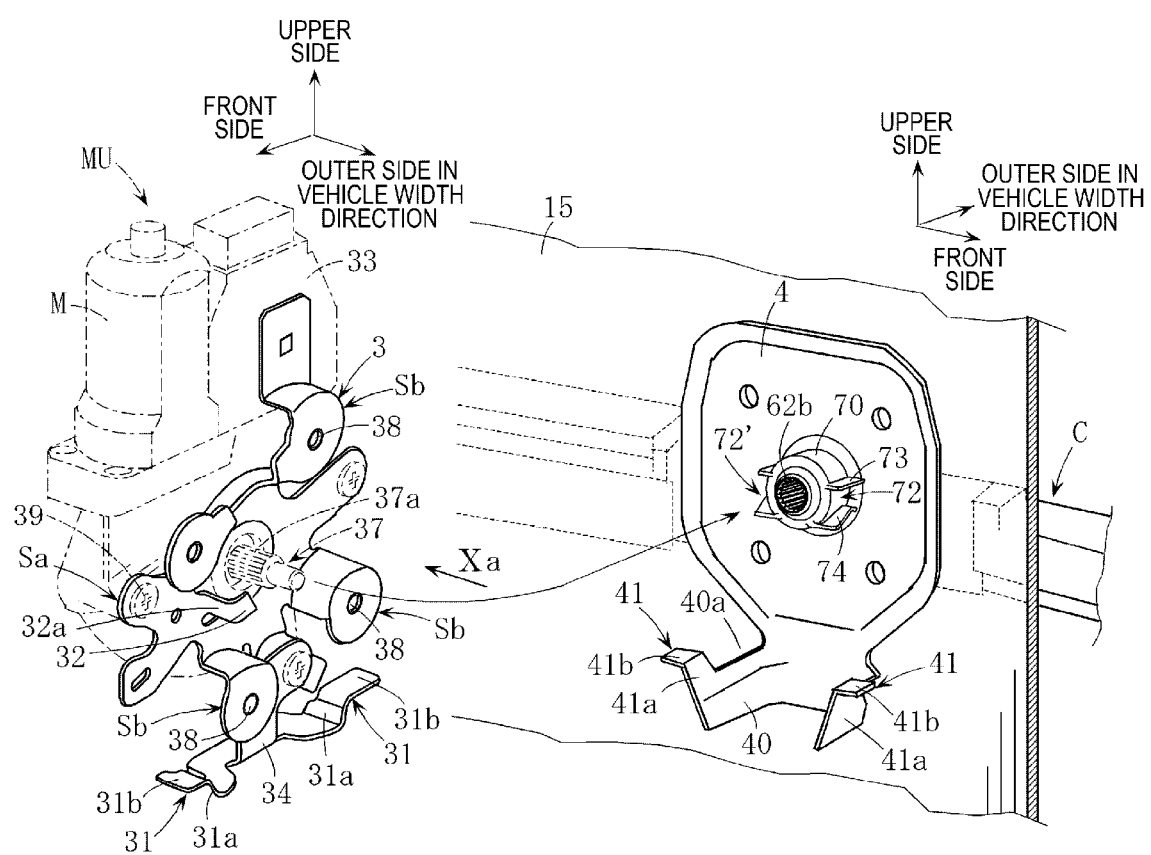
FIGS. 9A and 9B are main-part exploded schematic perspective views of the vehicle structure illustrated in FIG. 5.
Figure 10A:
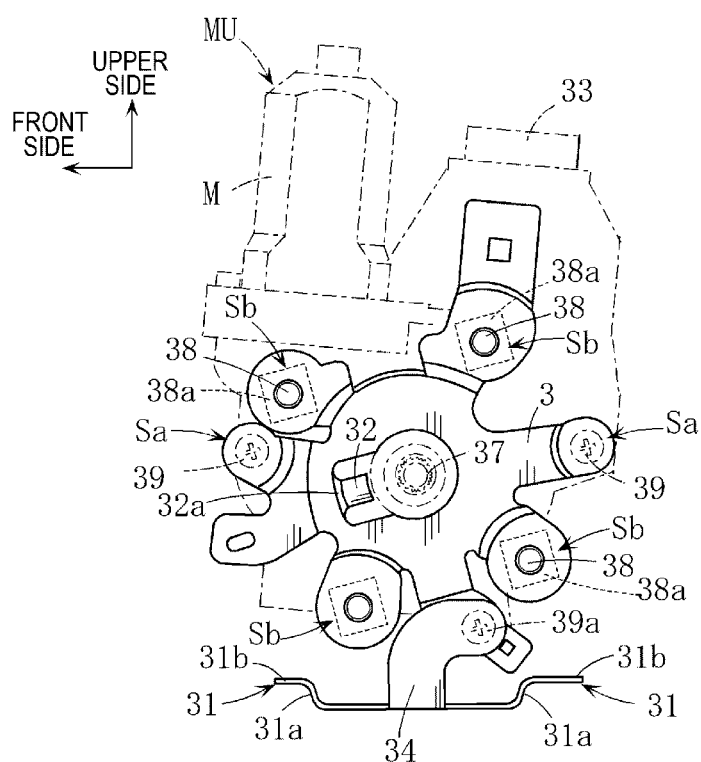
FIG. 10A is a front view seen in a direction indicated by an arrow Xa in FIG. 9A.
Figure 10B:
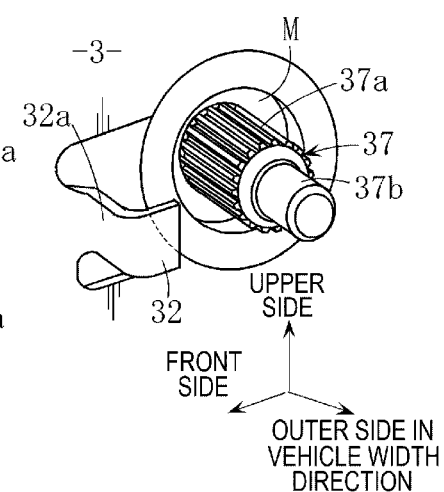
FIG. 10B is an enlarged perspective view of a main part in FIG. 10A.

As clearly illustrated in FIGS. 5 and 8, the drive pulley 62 includes a protruding tubular portion 62a protruding from one side surface portion of the drive pulley 62, and a serration hole 62b formed in a region close to an inner tip end of the protruding tubular portion 62a. On the other hand, a side plate portion 7 is attached to a region of the frame 64 of the belt operating mechanism portion C which faces the drive pulley 62 and the peripheral portion thereof, and the side plate portion 7 is provided with a protruding tubular portion 70 which has a substantially cylindrical shape and is located on an outer periphery of the protruding tubular portion 62a (see also FIG. 11).

An opening portion 15a is provided at a location of the side outer panel 15 which faces the drive pulley 62. The protruding tubular portions 62a and 70 are set to enter the inner side of the vehicle compartment through the opening portion 15a.

Although illustration is omitted, it is also possible to adopt a configuration in which a sheet-shaped sealing member made of synthetic rubber or the like is interposed between the side outer panel 15 and the side plate portion 7, and a gap in the opening portion 15a is closed by the sealing member to prevent water from entering the vehicle compartment.

As clearly illustrated in FIGS. 9A to 10B, the motor unit MU has a configuration in which a unit case 33 that collectively holds a motor M and accessories thereof is attached to a bracket 3. The bracket 3 is manufactured by pressing a metal plate, and has a plurality of regions Sa for attaching the motor M using, for example, screws 39, and a plurality of regions Sb for attaching the motor unit MU itself to the side outer panel 15. In each region Sb, a weld nut 38a is welded to form a screw hole 38, and bolt fastening by a bolt 98 to be described later is possible.

The output rotary shaft 37 of the motor M is provided with a serration shaft portion 37a that can be fitted into the above-described serration hole 62b. A portion of the output rotary shaft 37 closer to a tip end than the serration shaft portion 37a is provided with a non-serration shaft portion 37b that has a diameter smaller than that of the serration shaft portion 37a and is suitable for center position alignment with the serration hole 62b.

The auxiliary member 4 for motor unit attachment is manufactured by pressing a metal plate similarly to the bracket 3 described above. The auxiliary member 4 is attached to a location on an inner surface side of the side outer panel 15 which corresponds to the drive pulley 62 and the side plate portion 7 using a method such as welding, and has a function of reinforcing these locations.

The motor unit MU is attached in a manner of facing and being in contact with a front surface portion of the auxiliary member 4 that faces the inner side of the vehicle compartment. Therefore, the front surface portion of the auxiliary member 4 corresponds to an example of a "predetermined position of the side portion on the inner side of the vehicle compartment" in this disclosure.

The motor unit MU is attached to the auxiliary member 4 using a plurality of bolts 98 that penetrate the frame 64 of the belt operating mechanism portion C, the side plate portion 7, the side outer panel 15, and the auxiliary member 4 and are screwed into screw holes 38 in the motor unit MU.

In the vehicle structure A, when the motor unit MU is attached to the front surface portion of the auxiliary member 4, a unit that facilitates work of fitting the serration shaft portion 37a of the motor unit MU into the serration hole 62b of the drive pulley 62 of the belt operating mechanism portion C is provided. Hereinafter, this unit will be described. As illustrated in FIG. 5, a side inner panel 16 is located on the inner side of the vehicle compartment of the side outer panel 15, and the motor unit MU is attached via an opening portion 16a (a portion having a vertical width Ha) provided in the side inner panel 16.

The auxiliary member 4 is provided with a pair of first guide portions 41, and the protruding tubular portion 70 of the side plate portion 7 is provided with a second guide portion 72. Accordingly, a pair of first guided portions 31 and a second guided portion 32 are provided on the bracket 3 of the motor unit MU.

The combination of the second guide portion 72 and the second guided portion 32 corresponds to an example of a "rotation operation unit" in this disclosure.

More specifically, a lower portion of the auxiliary member 4 is provided with a protruding portion 40 protruding toward a front side (the inner side of the vehicle compartment) of the auxiliary member 4, and the protruding portion 40 is provided with the pair of first guide portions 41 disposed away from each other in the vehicle front-rear direction. Each of the first guide portions 41 includes a standing wall portion 41a standing in the vertical height direction, and a horizontal plate portion 41b having a substantially horizontal shape and connected to an upper end of the standing wall portion 41a. In the protruding portion 40, a recessed portion 40a having a height lower than that of the horizontal plate portion 41b is formed on a rear side of the first guide portion 41. As will be described later, the recessed portion 40a is a portion used to avoid interference between the motor unit MU and the protruding portion 40 when the motor unit MU rotates.

The pair of first guided portions 31 are implemented by providing an inverted T-shaped region 34 in a lower portion of the bracket 3 of the motor unit MU, and are disposed away from each other in the vehicle front-rear direction. Each of the first guided portions 31 includes a standing wall portion 31a standing in the vertical height direction, and a horizontal plate portion 31b having a substantially horizontal shape and connected to an upper end of the standing wall portion 31a.

In the present embodiment, the inverted T-shaped region 34 is separate from other portions of the bracket 3 and is coupled to the other portions using a screw 39a or the like. According to such a configuration, compared to a case in which the entire bracket 3 is pressed from one metal plate, the cutting layout efficiency is improved, and manufacturing cost is preferably reduced. It is also suitable to appropriately change a specification of the first guided portion 31 according to various situations. However, it is needless to say that this disclosure is not limited thereto.

According to the first guide portions 41 and the first guided portions 31 described above, as illustrated in FIGS. 7B and 8, when the pair of first guided portions 31 are placed on the first guide portions 41, arrangements of the motor unit MU in the vertical height direction and the vehicle front-rear direction are defined. Accordingly, it is possible to obtain a state in which the serration shaft portion 37a and the serration hole 62b are brought close to each other and center positions thereof are aligned. At this time, a state to be described later with reference to FIG. 6B, that is, a state in which positions of the second guided portion 32 and the second guide portion 72 are aligned can also be obtained.

On the other hand, in the bracket 3 of the motor unit MU, a standing piece portion 32a standing outward in the vehicle width direction is provided in a vicinity of the output rotary shaft 37, and a tip end portion of the standing piece portion 32a is bent. This bent portion is the second guided portion 32. In contrast, a recessed groove portion formed by being sandwiched between upper and lower protruding ribs 73 and 74 is formed on an outer peripheral surface of the protruding tubular portion 70, and this recessed groove portion is the second guide portion 72. The second guided portion 32 can enter the second guide portion 72.

As clearly illustrated in FIG. 6B, the lower protruding rib 74 constituting the second guide portion 72 includes a front horizontal portion 74a, an inclined portion 74b, and a rear engagement portion 74c. The inclined portion 74b is a portion having an inclined shape and inclined rearward and upward in a side view such that a height thereof increases outward in the vehicle width direction. The rear engagement portion 74c is a portion that is connected to a further outer side in the vehicle width direction than the inclined portion 74b, has a height lower than that of a location of the inclined portion 74b that has the highest height, and is a portion that can engage with and hold the inclined portion 74b.

As illustrated in FIG. 6B, when the motor unit MU advances toward the second guide portion 72 in a state in which the second guided portion 32 is moved close to face the second guide portion 72, the second guided portion 32 enters the second guide portion 72.

Figure 7A:
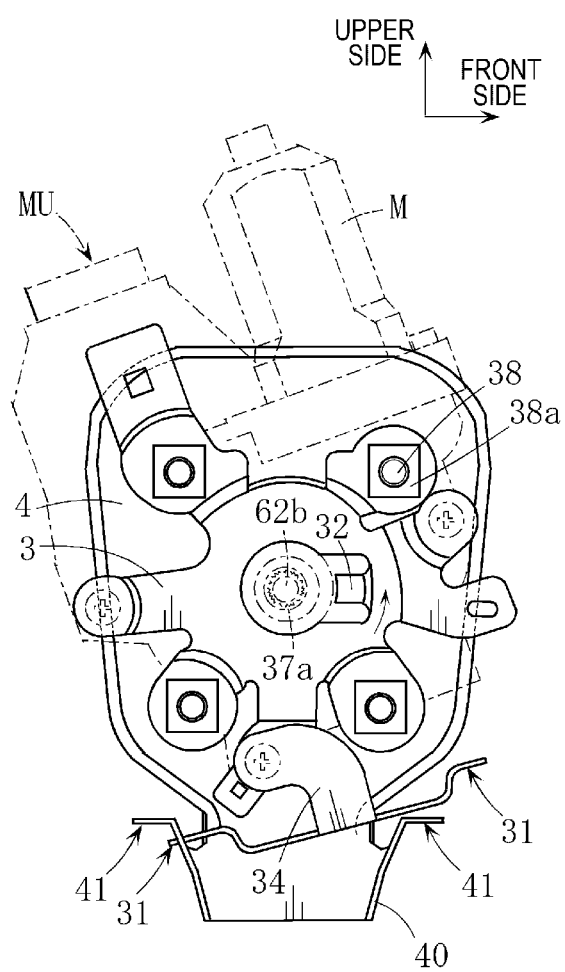
FIG. 7A is a schematic view in a state in which the motor unit is seen through in a direction indicated by an arrow VIIa in FIG. 6A.

Thereafter, when the second guided portion 32 advances to a position of the inclined portion 74b of the second guide portion 72, the second guided portion 32 receives an upward force, and thus the entire motor unit MU rotates about the output rotary shaft 37 (about the centers of the serration shaft portion 37a and the serration hole 62b). At this time, as illustrated in FIG. 7A, one of the pair of first guide portions 41 on a descending side enters the recessed portion 40a, and thus improper interference between the first guided portion 31 of the motor unit MU and the protruding portion 40 of the auxiliary member 4 is appropriately avoided.

When the second guided portion 32 reaches the rear engagement portion 74c by crossing over the inclined portion 74b, rotation of the motor unit MU is stopped. The motor unit MU is also prevented from returning to an original angle, and the motor unit MU can be appropriately maintained in a predetermined originally intended posture. Here, the predetermined originally intended posture is a posture in which the motor unit MU may be appropriately attached to the front surface portion of the auxiliary member 4 using the plurality of bolts 98, and is a posture illustrated in FIGS. 5, 6A, 7A, and the like.

A guide portion 72' is provided on the outer peripheral surface of the protruding tubular portion 70 on a side opposite to the second guide portion 72, and is symmetrical to the second guide portion 72 (that is, asymmetrical in the front-rear direction). The sliding door operation device B according to the present embodiment is applied to the sliding door 11 on a left side of the vehicle 1. Alternatively, different from this, when the sliding door operation device B is applied to a sliding door on a right side, the guide portion 72' can be used as a portion corresponding to the second guide portion 72 according to the present embodiment.

Next, functions of the vehicle structure A will be described.

Figure 7B:
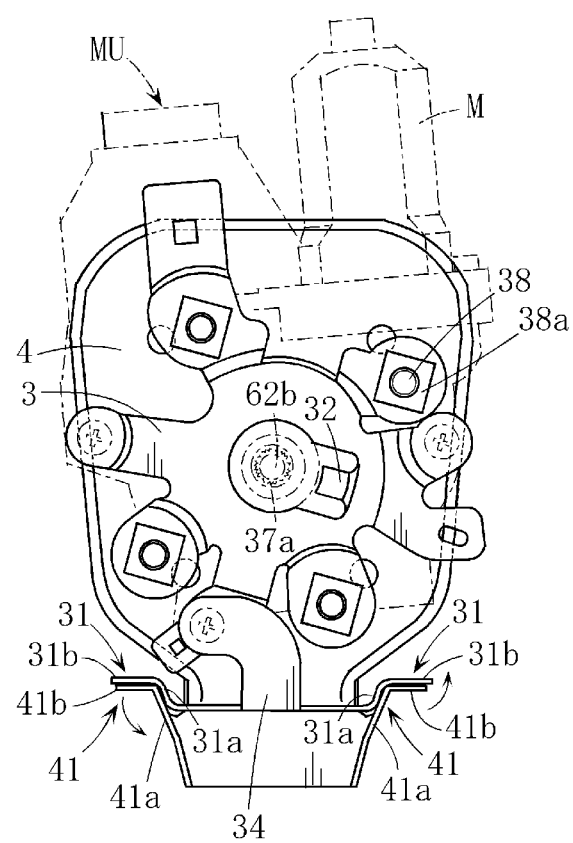
FIG. 7B is a schematic view in a state in which the motor unit is seen through in a direction indicated by an arrow VIIb in FIG. 6B.

When manufacturing the vehicle structure A, in order to attach the motor unit MU, a worker in the vehicle compartment brings the motor unit MU closer toward the auxiliary member 4 from the opening portion 16a of the side inner panel 16 as illustrated in FIG. 5. At this time, the pair of first guided portions 31 of the motor unit MU are placed on the pair of first guide portions 41 of the auxiliary member 4, and are set in states as illustrated in FIGS. 6B, 7B, and 8. Here, the first guide portions 41 are provided on the protruding portion 40 protruding from the auxiliary member 4 to the inner side of the vehicle compartment, and are close to a front side of the worker who attaches the motor unit MU (close to the opening portion 16a). Therefore, the setting work is easier.

According to the above-described setting, the serration shaft portion 37a and the serration hole 62b are brought close to each other, and the center positions thereof are aligned. In this state, when the motor unit MU is pushed toward the auxiliary member 4 so as to slide the first guided portion 31 with respect to the first guide portion 41, first, the non-serration shaft portion 37b of the output rotary shaft 37 can enter the serration hole 62b so as to prevent the aligned center positions thereof from being shifted.

Next, when the motor unit MU is further pushed toward the auxiliary member 4, as described with reference to FIGS. 6A to 7B, the second guided portion 32 enters the second guide portion 72, and the motor unit MU rotates about the output rotary shaft 37 (about the centers of the serration shaft portion 37a and the serration hole 62b) by a guiding action of the inclined portion 74b. When such rotation is performed, the serration shaft portion 37a and the serration hole 62b are not difficult to be fitted to each other while protruding portions thereof are in contact with each other, and can be smoothly fitted to each other. Since the second guide portion 72 is provided at a location close to the serration hole 62b, it is also possible to expect an effect of improving accuracy when the motor unit MU is rotated about the center of the serration hole 62b or the center of the serration shaft portion 37a by a guiding action of the second guide portion 72. When the second guided portion 32 is disposed on and engaged with the rear engagement portion 74c of the second guide portion 72, the posture of the motor unit MU can be stabilized, and thus the bolt fastening work of the motor unit MU is also facilitated.

As described above, according to the vehicle structure A of the present embodiment, it is possible to smoothly fit the serration shaft portion 37a and the serration hole 62b by rotating the motor unit MU in addition to the work of aligning the center positions of the serration shaft portion 37a of the motor unit MU and the serration hole 62b of the drive pulley 62. Therefore, as illustrated in FIG. 5, it is preferable when the attachment work of the motor unit MU needs to be performed from the opening portion 16a of the side inner panel 16. According to the present embodiment, since the attachment work of the motor unit MU is facilitated and accelerated, it is preferable to improve productivity and reduce the manufacturing cost.

This disclosure is not limited to contents of the above-described embodiment. The specific configuration of each part in the vehicle structure provided with a sliding door according to this disclosure can be freely designed and modified in various manners within the scope intended by this disclosure.

In the above-described embodiment, the moving member operating mechanism portion according to this disclosure is implemented by the belt operating mechanism portion C, and the toothed belt 60 is used as the moving member.

However, this disclosure is not limited thereto. The belt is not limited to the toothed belt, and may be another type of belt such as a chain belt. The moving member may be a wire-shaped member (a wire itself or a member similar to a wire) instead of the belt.

The driven rotary member (the member that receives a rotational driving force from the motor unit) of the moving member operating mechanism portion according to this disclosure may also be another member instead of the drive pulley 62 that is a toothed pulley.

In the above-described embodiment, the serration shaft portion is on the motor unit side, and the serration hole is on a side to which the motor unit is to be attached. Alternatively, an occasion opposite to this may also be possible.

In the above-described embodiment, the front surface portion of the auxiliary member 4 is the "predetermined position of the side portion on the inner side of the vehicle compartment" in this disclosure. Alternatively, the motor unit MU may also be directly attached to the side outer panel 15 in a state in which the auxiliary member 4 is omitted.

The first guided portion and the second guided portion in this disclosure may also be provided in a portion other than the bracket of the motor unit MU instead of being provided in the bracket 3 of the motor unit MU.

The first guide portion and the second guide portion according to this disclosure are not limited to being provided on the lower portion of the auxiliary member 4 or the protruding tubular portion 70 of the side plate portion 7, and may also be provided on other members or portions.

In the above-described embodiment, bolts, nuts and a welding method are used as a method for coupling a plurality of members, and various coupling methods other than these methods can be used.

According to an aspect of this disclosure, a vehicle structure provided with a sliding door includes a sliding door operation device configured to move the sliding door on a side portion of a vehicle. The sliding door operation device includes a motor unit attached to a predetermined position of the side portion on an inner side of a vehicle compartment, and a moving member operating mechanism portion including a belt or a wire-shaped moving member coupled to the sliding door and a driven rotary member that receives a rotational driving force from the motor unit, the moving member being movable along a predetermined path on an outer surface side of the side portion of the vehicle. The motor unit and the driven rotary member are provided with a serration shaft portion and a serration hole that are fitted to each other as a drive coupling unit of the motor unit and the driven rotary member. The vehicle structure provided with a sliding door further includes a rotation operation unit configured to rotate the motor unit about centers of the serration shaft portion and the serration hole when the motor unit is pushed toward the driven rotary member to fit the serration shaft portion and the serration hole to each other in a state in which the motor unit is disposed on a front side of the driven rotary member while not being attached to the predetermined position.

According to such a configuration, the following effects can be attained.

That is, in a case in which the motor unit is attached to the predetermined position of the side portion of the vehicle on the inner side of the vehicle compartment, when the motor unit is pushed toward the driven rotary member from the front side of the driven rotary member to fit the serration shaft portion and the serration hole that are provided in the motor unit and the driven rotary member of the moving member operating mechanism portion to each other, the motor unit rotates about the centers of the serration shaft portion and the serration hole by an action of the rotation operation unit. Therefore, the serration shaft portion and the serration hole are not difficult to be fitted to each other while protruding portions thereof are in contact with each other, and can be smoothly fitted to each other. Therefore, it is possible to facilitate the attachment work of the motor unit and to appropriately promote the improvement in productivity of the vehicle and the reduction in manufacturing cost.

According to the above aspect of the disclosure, it is preferable that the side portion on the inner side of the vehicle compartment is provided with a first guide portion disposed on the front side of the driven rotary member, the motor unit is provided with a first guided portion, and the motor unit is set such that the first guided portion comes into contact with the first guide portion in a state in which the motor unit is not attached to the predetermined position.

According to such a configuration, the following effects can be attained.

That is, when the motor unit is attached to the predetermined position of the side portion of the vehicle on the inner side of the vehicle compartment, the motor unit and the moving member operating mechanism portion can be brought close to each other by bringing the first guided portion of the motor unit into contact with the first guide portion provided on the inner side of the vehicle compartment, and the work can be facilitated.

According to the above aspect of the disclosure, it is preferable that the side portion on the inner side of the vehicle compartment is provided with a second guide portion, the motor unit is provided with a second guided portion, the motor unit rotates in response to the second guided portion being brought into contact with the second guide portion and moved while being guided by the second guide portion when the motor unit is pushed toward the driven rotary member to fit the serration shaft portion and the serration hole to each other in a state in which the motor unit is disposed on the front side of the driven rotary member while not being attached to the predetermined position, and the rotation operation unit includes the second guided portion and the second guide portion.

According to such a configuration, the following effects can be attained.

That is, in a case in which the motor unit is attached to the predetermined position of the side portion of the vehicle on the inner side of the vehicle compartment, when the motor unit is pushed toward the driven rotary member, the motor unit can be rotated about the centers of the serration shaft portion and the serration hole by actions of the second guided portion and the second guide portion which constitute the rotation operation unit, and the work can be facilitated.

According to the above aspect of the disclosure, it is preferable that the side portion on the inner side of the vehicle compartment is provided with the first guide portion disposed away from the driven rotary member to the front side of the driven rotary member and a second guide portion disposed closer to the driven rotary member than the first guide portion, the motor unit is provided with the first guided portion and a second guided portion, the motor unit is set such that the first guided portion comes into contact with the first guide portion in a state in which the motor unit is not attached to the predetermined position, and thus the serration shaft portion and the serration hole are close to each other and allow alignment of center positions thereof, the motor unit rotates in response to the second guided portion being brought into contact with the second guide portion and moved while being guided by the second guide portion when the motor unit is pushed toward the driven rotary member in a state in which the first guided portion is in contact with the first guide portion, and the rotation operation unit includes the second guided portion and the second guide portion.

According to such a configuration, the following effects can be attained.

That is, when the motor unit is attached to the predetermined position of the side portion of the vehicle on the inner side of the vehicle compartment, the first guided portion of the motor unit is brought into contact with the first guide portion provided on the inner side of the vehicle compartment, so that the serration shaft portion and the serration hole of the motor unit and the driven rotary member of the moving member operating mechanism portion can be brought close to each other and the center positions thereof can be aligned. Since the first guide portion is disposed away from the driven rotary member to the front side of the driven rotary member and is located on a front side relative to the second guide portion, the first guide portion can be made close to a worker who performs the attachment work of the motor unit and is easily viewed by the worker. Therefore, it is possible to facilitate the work of bringing the first guided portion into contact with the first guide portion and to facilitate the work of aligning the center positions of the serration shaft portion and the serration hole.

When the motor unit is pushed toward the driven rotary member in a state in which the first guided portion is in contact with the first guide portion, the motor unit can be rotated about the centers of the serration shaft portion and the serration hole by the actions of the second guided portion and the second guide portion which constitute the rotation operation unit.

Therefore, according to the above configuration, it is possible to easily and appropriately perform, in a short time, a series of work from the work of aligning the centers of the serration shaft portion and the serration hole which are provided in the motor unit and the driven rotary member of the moving member operating mechanism portion to the work of rotating the motor unit to appropriately fit the serration shaft portion and the serration hole to each other, and it is further preferable to improve the productivity, reduce the manufacturing cost, and the like.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle structure provided with a sliding door, the vehicle structure comprising:
    a sliding door operation device configured to move the sliding door on a side portion of a vehicle, wherein the sliding door operation device includes
        a motor unit attached to a predetermined position of the side portion of the vehicle on an inner side of a vehicle compartment, and
        a moving member operating mechanism portion including a belt or a wire-shaped moving member coupled to the sliding door and a driven rotary member that receives a rotational driving force from the motor unit, the moving member being movable along a predetermined path on an outer surface side of the side portion of the vehicle, and
    the motor unit and the driven rotary member are provided with a serration shaft portion and a serration hole that are fitted to each other as a drive coupling unit of the motor unit and the driven rotary member,
    the vehicle structure provided with the sliding door further comprising:
    a rotation operation unit configured to rotate the motor unit about centers of the serration shaft portion and the serration hole when the motor unit is pushed toward the driven rotary member to fit the serration shaft portion and the serration hole to each other in a state in which the motor unit is disposed on a front side of the driven rotary member while not being attached to the predetermined position, wherein
    the side portion on the inner side of the vehicle compartment is provided with a first guide portion disposed on the front side of the driven rotary member,
    the motor unit is provided with a first guided portion,
    the side portion on the inner side of the vehicle compartment is provided with a second guide portion disposed closer to the driven rotary member than the first guide portion,
    the motor unit is provided with a second guided portion,
    the motor unit is set such that the first guided portion comes into contact with the first guide portion in a state in which the motor unit is not attached to the predetermined position, and thus the serration shaft portion and the serration hole are close to each other and allow alignment of center positions thereof,
    the motor unit rotates in response to the second guided portion being brought into contact with the second guide portion and moved while being guided by the second guide portion when the motor unit is pushed toward the driven rotary member in a state in which the first guided portion is in contact with the first guide portion, and
    the rotation operation unit includes the second guided portion and the second guide portion.

2. The vehicle structure provided with the sliding door according to claim 1, wherein
    the motor unit rotates in response to the second guided portion being brought into contact with the second guide portion and moved while being guided by the second guide portion when the motor unit is pushed toward the driven rotary member to fit the serration shaft portion and the serration hole to each other in a state in which the motor unit is disposed on the front side of the driven rotary member while not being attached to the predetermined position.

3. The vehicle structure provided with the sliding door according to claim 2, wherein
    the second guide portion comprises two protruding ribs defining a recessed groove portion sandwiched between the two protruding ribs.

4. The vehicle structure provided with the sliding door according to claim 3, wherein
    the two protruding ribs include an upper protruding rib and a lower protruding rib, and
    the lower protruding rib includes an inclined portion.

5. The vehicle structure provided with the sliding door according to claim 4, wherein
the inclined portion has first and second opposite ends, and
a first spacing between the first end of the inclined portion and the upper protruding rib being greater than a second spacing between the second end of the inclined portion and the upper protruding rib such that the width of the recessed groove portion tapers in a direction facing away from an open end of the recessed groove portion.

6. The vehicle structure provided with the sliding door according to claim 5, wherein
the lower protruding rib further includes a rear engagement portion extending from the second end of the inclined portion in the direction facing away from the open end of the recessed groove, and
a third spacing between the rear engagement portion and the upper protruding rib is less than the first spacing.

* * * * *